US008835492B2

(12) United States Patent
Lee et al.

(10) Patent No.: US 8,835,492 B2
(45) Date of Patent: *Sep. 16, 2014

(54) TEMPERATURE AND PH SENSITIVE BLOCK COPOLYMER AND POLYMERIC HYDROGELS USING THE SAME

(75) Inventors: Doo Sung Lee, Suwon-si (KR); Min Sang Kim, Suwon-si (KR); Je Sun You, Suwon-si (KR); Huynh Dai Phu, Suwon-si (KR); Bong Sup Kim, Suwon-si (KR); Minh Khanh Nguyen, Suwon-si (KR)

(73) Assignee: Sungyunkwan University Foundation for Corporate Collaboration, Suwon-si (KR)

( * ) Notice: Subject to any disclaimer, the term of this patent is extended or adjusted under 35 U.S.C. 154(b) by 1846 days.

This patent is subject to a terminal disclaimer.

(21) Appl. No.: 11/815,960

(22) PCT Filed: Mar. 31, 2006

(86) PCT No.: PCT/KR2006/001185
§ 371 (c)(1),
(2), (4) Date: Aug. 9, 2007

(87) PCT Pub. No.: WO2006/109945
PCT Pub. Date: Oct. 19, 2006

(65) Prior Publication Data
US 2008/0293827 A1    Nov. 27, 2008

(30) Foreign Application Priority Data

Apr. 13, 2005 (KR) .................. 10-2005-0030834
Oct. 17, 2005 (KR) .................. 10-2005-0097674

(51) Int. Cl.
*A61K 31/21* (2006.01)
*C08G 81/00* (2006.01)
*C08L 71/02* (2006.01)
*C08G 65/333* (2006.01)
*C08L 53/00* (2006.01)
*C08G 65/332* (2006.01)
*C08G 73/02* (2006.01)
*C08G 65/331* (2006.01)
*C08L 67/00* (2006.01)

(52) U.S. Cl.
CPC .......... *C08G 65/33306* (2013.01); *C08G 81/00* (2013.01); *C08L 71/02* (2013.01); *C08L 2205/05* (2013.01); *C08L 53/00* (2013.01); *C08G 65/3322* (2013.01); *C08L 2203/02* (2013.01); *C08L 67/00* (2013.01); *C08G 65/3324* (2013.01); *C08G 73/028* (2013.01); *C08G 65/331* (2013.01)
USPC ........ 514/506; 514/579; 424/78.37; 528/271; 528/288

(58) Field of Classification Search
USPC ........ 514/506, 579, 508; 424/78.37; 528/271, 528/288
See application file for complete search history.

(56) References Cited

U.S. PATENT DOCUMENTS

| 4,882,168 | A | 11/1989 | Casey et al. |
| 4,942,035 | A | 7/1990 | Churchill et al. |
| 5,476,909 | A | 12/1995 | Kim et al. |
| 6,476,156 | B1 | 11/2002 | Kim et al. |
| 2002/0131951 | A1* | 9/2002 | Langer et al. ............. 424/78.37 |

FOREIGN PATENT DOCUMENTS

| EP | 0092918 A2 | 11/1983 |
| JP | 58191714 A | 9/1983 |
| JP | 62-218456 A | 9/1987 |
| JP | 08-143651 A | 6/1996 |
| JP | 9511002 A | 11/1997 |
| JP | 11513985 A | 11/1999 |
| JP | 2000503645 A | 3/2000 |
| JP | 2004511596 A | 4/2004 |
| JP | 2005133231 A | 5/2005 |
| JP | 2006506335 A | 2/2006 |
| JP | 2006515640 A | 6/2006 |
| JP | 2008502785 A | 1/2008 |
| JP | 2008520798 A | 6/2008 |
| JP | 2009523864 A | 6/2009 |
| KR | 2000-0012970 A | 3/2000 |
| KR | 10-2003-7006265 A | 7/2003 |

(Continued)

OTHER PUBLICATIONS

Han et al. Colloids and Surfaces A: Physicochem. Eng. Aspects 214 (2003), pp. 49-49.*

(Continued)

*Primary Examiner* — Renee Claytor
*Assistant Examiner* — Shobha Kantamneni
(74) *Attorney, Agent, or Firm* — Sughrue Mion, PLLC

(57) ABSTRACT

Disclosed is a block copolymer formed by coupling the following components with each other: (a) a copolymer (A) of a polyethylene glycol (PEG) type compound with a biodegradable polymer; and (b) at least one oligomer (B) selected from the group consisting of poly(β-amino ester) and poly(amido amine). A method for preparing the same block copolymer, and a polymeric hydrogel type drug composition comprising the temperature and pH-sensitive block copolymer and a physiologically active substance that can be encapsulated with the block copolymer are also disclosed. The multiblock copolymer is obtained by copolymerization of a pH-sensitive poly(β-amino ester) and/or poly(amido amine) type oligomer, a hydrophilic and temperature-sensitive polyethylene glycol type compound and a hydrophobic and biodegradable polymer. Therefore, the block copolymer can form a polymeric hydrogel structure due to its amphiphilicity resulting from the combination of a hydrophilic group and a hydrophobic group in the copolymer and ionization characteristics depending on pH variations, and thus can be used as a drug carrier for target-directed drug delivery depending on pH variations in the body.

19 Claims, 3 Drawing Sheets

(56) References Cited

FOREIGN PATENT DOCUMENTS

| WO | 9526376 | A2 | 10/1995 |
|---|---|---|---|
| WO | 9715287 | A1 | 5/1997 |
| WO | 9725067 | A2 | 7/1997 |
| WO | 99/01469 | A1 | 1/1999 |
| WO | 0231025 | A2 | 4/2002 |
| WO | 2004009664 | A2 | 1/2004 |
| WO | 2004064816 | A1 | 8/2004 |
| WO | 2005121196 | A1 | 12/2005 |
| WO | 2006098547 | A1 | 9/2006 |
| WO | 2007082305 | A2 | 7/2007 |

OTHER PUBLICATIONS

German Patent Office, Office Action issued in corresponding German Application No. 11 2006 000 685.1, dated Apr. 12, 2011.

Stubbs et al., "Causes and Consequences of Tumour Acidity and Implications for Treatment," Molecular Medicine Today, 2000, vol. 6, pp. 15-19.

Ruth Duncan, "The Dawning Era of Polymer Therapeutics," Nature Reviews: Drug Discovery, 2003, vol. 2, pp. 347-360.

* cited by examiner

TEMPERATURE AND PH SENSITIVE BLOCK COPOLYMER AND POLYMERIC HYDROGELS USING THE SAME

TECHNICAL FIELD

The present invention relates to a biodegradable block copolymer useful for temperature and pH sensitive drug carriers, a method for preparing the same, and a polymeric hydrogel type drug composition comprising the above block copolymer. More particularly, the present invention relates to a multiblock copolymer derived from a temperature-sensitive block copolymer comprising a polyethylene glycol type compound and a biodegradable polyester polymer compound, and a poly(β-amino ester) compound and/or a poly(amido amine) compound that shows ionization characteristics depending on pH values. The multiblock copolymer according to the present invention is capable of target-directed drug delivery depending on temperature and pH variations in the body. The present invention also relates to a polymeric hydrogel comprising the above multiblock copolymer.

BACKGROUND ART

Recently, in the field of medical industry and drug delivery system, intensive research and development has been performed to develop a target-directed drug carrier that utilizes a sol-gel transition phenomenon of hydrogel prepared from an amphiphilic polymer having a hydrophobic group as well as a hydrophilic group.

U.S. Pat. No. 4,942,035 discloses the use of a copolymer of polyalkylene glycol, as a hydrophilic polymer, with polylactide, polyglycolide or polycaprolactone, as a biodegradable polyester polymer, for improving the problem of non-degradability of a so-called pluronic gel (polyethylene glycol and polyethylene oxide-polypropylene oxide-polyethylene oxide block copolymer) in the body.

Additionally, U.S. Pat. No. 5,476,909 discloses an A-B-A type triblock copolymer as a biodegradable polyester polymer, wherein the hydrophobic block (A) is limited to polylactide (PLA), polyglycolide (PGA) and copolymers thereof, and the hydrophilic block (B) is limited to polyethylene glycol (PEG) and derivatives thereof.

Meanwhile, Korean Laid-Open Patent No. 2000-0012970 discloses a pH-sensitive polymer containing a sulfoneamide group and a method for preparing the same. More particularly, the Korean Patent discloses variations in the solubility of a linear polymer formed by random copolymerization of a sulfoneamide monomer with dimethylacryl amide or isopropylacryl amide, or the swelling degree of the crosslinked polymer thereof.

The aforementioned prior art utilizes a block copolymer of a hydrophobic biodegradable polymer with a hydrophilic polymer, which shows a sol-gel transition phenomenon depending on temperatures. More particularly, when the block copolymer is injected into the body in the form of an aqueous solution present in a sol state, it undergoes a transition into a gel state, so that it can be used as a release-controlled drug carrier that carries a drug stably in the body and releases the drug gradually. However, when such temperature-sensitive block copolymers having sol-gel transition characteristics are used, there is a problem in that the block copolymers may cause gelling before they are injected completely into the body, because injection of the block copolymers into the body generates a thermal equilibrium state between the injection needle temperature and the body temperature due to the body temperature. Additionally, although it is reported that the hydrophobic part comprising PLA, PLGA or PCL shows pH sensitivity, actual pH sensitivity of the hydrophobic part is not so high as to be applied to the pH condition in the body. Therefore, the block copolymers according to the prior art are not suitable to be applied for drug delivery systems.

DISCLOSURE OF INVENTION

Technical Problem

We have recognized that when a temperature-sensitive block copolymer hydrogel comprising a polyethylene glycol type compound and a biodegradable polyester polymer compound is used alone, there is a problem in that injection of the hydrogel into the body may cause gelling before it is introduced completely into the body due to the heat transfer caused by the body temperature, resulting in occlusion of an injection needle. Under the above recognition, we have made intensive studies to develop a temperature- and pH-sensitive block copolymer via a coupling reaction of the above temperature-sensitive block copolymer with poly(β-amino ester) (PAE), poly(amido amine) (PAA) or a combination (PAEA) thereof, which shows pH-sensitivity through a change in the ionization degree thereof depending on pH values in the body.

Actually, we have found that the block copolymer hydrogel according to the present invention shows sol-gel transition behavior sensitive to pH values as well as temperatures. For example, the hydrogel according to the present invention shows sol-gel transition behavior, wherein it undergoes gelling at a pH range of 7~7.4 similar to pH values in the body, while it is converted into sol at a pH value lower than the above range. Hence, the block copolymer hydrogel according to the present invention forms gel stably with no problem of occlusion of an injection needle, occurring in the conventional temperature-sensitive hydrogel. Also, we have found that the resultant block can be applied as a carrier for use in release-controlled drug delivery, which carries a drug stably at a specific temperature and a specific pH value in the body and releases the drug gradually.

Additionally, we have conducted studies in order to control the biodegradation rate of a pH-sensitive polymer in the human body. Finally, we succeeded in controlling the biodegradation rate as desired in the human body by mixing a suitable amount of a poly(amido amine) having an amide bond instead of an ester bond in its backbone and thus showing a relatively slow biodegradation rate with the pH-sensitive poly (β-amino ester) having an ester bond in its backbone and thus showing a relatively high biodegradation rate.

Therefore, it is an object of the present invention to provide a novel temperature- and pH-sensitive multiblock copolymer, a method for preparing the same, and a polymeric hydrogel composition comprising the same multiblock copolymer.

Technical Solution

According to an aspect of the present invention, there is provided a block copolymer formed by coupling the following components with each other: (a) a copolymer (A) of a polyethylene glycol (PEG) compound with a biodegradable polymer; and (b) at least one oligomer (B) selected from the group consisting of poly(β-amino ester) and poly(amido amine). There is also provided a method for preparing the same block copolymer.

According to another aspect of the present invention, there is provided a polymeric hydrogel type drug composition comprising the above temperature and pH-sensitive block copolymer and a physiologically active substance that can be encapsulated with the block copolymer.

Hereinafter, the present invention will be explained in more detail.

The present invention is characterized in that a temperature-sensitive block copolymer formed by the copolymerization of a polyethylene glycol type compound and a biodegradable polymer compound is coupled with poly(β-amino ester), poly(amido amine) or a combination (PAEA) thereof, which experiences a change in the ionization degree depending on pH values, to provide a temperature and pH sensitive multiblock copolymer, which is sensitive to pH variations as well as temperature variations in the body, and to provide polymeric hydrogel using the same multiblock copolymer.

The block copolymer according to the present invention having the above characteristics can provide the following effects:

(1) The conventional block copolymer comprising a hydrophilic polymer such as polyethylene glycol and a biodegradable hydrophobic polymer shows sol-gel transition behavior due to a change in the physical properties of the hydrophilic block and the hydrophobic block. However, it was difficult to apply such conventional block copolymers to an actual drug delivery system due to their poor sensitivity to temperature variations and side effects in the body, caused by the thermal equilibrium of a transfer medium.

On the contrary, according to the present invention, the temperature-sensitive block copolymer comprising the hydrophilic polymer and the biodegradable polymer is coupled with a compound such as poly(β-amino ester) (PAE), poly(amido amine) (PAA) or a combination (PAEA) thereof, which shows an ionization degree varied with pH values. Therefore, the resultant block copolymer has pH sensitivity as well as temperature sensitivity, and thus can solve the aforementioned problem related to the conventional temperature-sensitive hydrogel and can form more stable hydrogel.

Particularly, the temperature and pH sensitive block copolymer according to the present invention forms a physically and chemically stable hydrogel in a specific pH range, and undergoes a transition into a sol state in the other pH ranges. In brief, the block copolymer according to the present invention can show reversible sol-gel transition behavior. In other words, in a low pH range (e.g. pH<7.0), the tertiary amine group present in poly(β-amino ester) (PAE) shows an increased ionization degree, so that the whole PAE is converted into a water soluble compound that cannot form hydrogel. On the other hand, in a high pH range (e.g. pH>7.2), PAE has a decreased ionization degree and shows hydrophobicity, and thus can form hydrogel.

(2) Additionally, the temperature and pH sensitive block copolymer is safe in the human body, and thus can be used as a release-controlled drug carrier in the medical field and in the gene transfer and drug delivery systems, in particular, as a drug carrier and drug releasing substance. Also, the block copolymer can be applied to a carrier for cell transfer, used as an injectable scaffold.

(3) Further, according to the present invention, it is possible to modify the constitutional elements forming the block copolymer and physical properties thereof, for example, the composition, molar ratio, molecular weight and/or functional groups in the blocks, so as to design the reversible sol-gel transition behavior of the block copolymer in various manners. Thus, it is expected that the block copolymer according to the present invention can be used for various applications, including cancer cell mutation, gene mutation and others.

One constitutional element forming the temperature- and pH-sensitive block copolymer according to the present invention is a copolymer (A) of a PEG type compound with a biodegradable compound. The copolymer (A) allows a sol-gel transition depending on temperature variations, because the hydrophilic PEG type compound and the hydrophobic biodegradable polymer are present in the same molecule.

The PEG type compound forming the copolymer (A) is a general PEG compound known to one skilled in the art. Although there is no particular limitation in selection of the PEG compound, it is preferable to use a PEG type compound represented by the following formula 1.

[Formula 1]

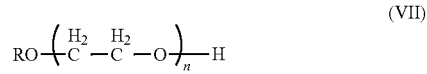

wherein R is a hydrogen atom or a C1~C5 alkyl group, and n is a natural number ranging from 11 to 45.

Although there is no particular limitation in the molecular weight (Mn) of the polyethylene glycol type compound, the polyethylene glycol type compound preferably has a molecular weight of 500 to 5000. Particularly, in the case of polyethylene glycol (PEG), wherein R is a hydrogen atom, the polyethylene glycol preferably has a molecular weight of 1000 to 2000. In the case of methoxypolyethylene glycol (MPEG), wherein R is a methyl group, the methoxypolyethylene glycol preferably has a molecular weight of 500 to 5000. When the polyethylene glycol type compound has a molecular weight (Mn) away from the above range (for example, a molecular weight of less than 500 or greater than 5000), it is difficult to form gel. Even if gel is formed from the block copolymer, the resultant gel shows poor gel strength, so that it cannot be used as a carrier for drug delivery.

The biodegradable polymer forming the copolymer (A) is a conventional biodegradable polymer known to one skilled in the art. Preferably, the biodegradable polymer is a biodegradable aliphatic polyester polymer, and non-limiting examples thereof include caprolactone (CL), glycolide (GA), lactide (LA) or a copolymer thereof. In addition to the aforementioned polymers, any biodegradable polymers capable of forming a copolymer with the PEG type compound may be used in the scope of the present invention.

There is no particular limitation in the copolymer (A) formed by the polymerization of the polyethylene type compound and the biodegradable polymer, as long as the copolymer comprises the above components. However, it is preferable that the copolymer has at least one substituent selected from the group consisting of a primary amine group, a secondary amine group and a double bond, which are capable of reacting with a poly(β-amino ester) and/or poly(amido amine) block. Non-limiting examples of the copolymer (A) include polylactide (PLA), polyglycolide (PGA), polycaprolactone (PCL), poly(caprolactone-lactide) random copolymer (PCLA), poly(caprolactone-glycolide) random copolymer (PCGA), poly(lactide-glycolide) random copolymer (PLGA), or the like.

Although there is no particular limitation in the molecular weight ratio of the PEG type compound to the biodegradable polymer in the copolymer (A), the ratio is preferably 1:1~3. If the ratio is less than 1:1, it is not possible to form gel. If the ratio is greater than 1:3, hydrophobicity increases undesirably, so that the resultant block copolymer may not be dissolved in water.

Additionally, when the biodegradable polymer forming the copolymer is PCLA, PCGA or PLGA, it is possible to improve the temperature sensitivity and pH sensitivity by controlling the molar ratio thereof.

Another constitutional element forming the temperature- and pH-sensitive block copolymer according to the present invention may be any compound that shows an ionization degree varied with pH values with no particular limitation.

Particularly, the compound is an oligomer (B) formed from a poly(β-amino ester) and/or poly(amido amine) type compound having hydrophobicity and pH-sensitivity at the same time.

The poly(β-amino ester)- and poly(amido amine)-based oligomer (PAEA) comprising poly(β-amino ester) (PAE), poly(amido amine) (PAA) or a mixture containing them in an adequate ratio have ionization characteristics characterized by water solubility varied with pH values due to the presence of a tertiary amine group ionized at a pH of 7.2 or less. Therefore, the oligomer can show pH sensitivity by forming hydrogel or by maintaining a sol state depending on pH variations in the body.

The above compounds may be prepared by a process known to one skilled in the art. In one embodiment of such processes, a bisacrylate compound and/or a bisacrylamide compound having a double bond is polymerized with an amine compound via the Michael reaction mechanism to produce a poly(β-amino ester) (PAE), poly(amido amine) (PAA) or a mixed oligomer containing them in an adequate ratio.

The bisacrylate compound used in the above process may be represented by the following formula 2, and non-limiting examples of such bisacrylate compounds include ethylene glycol diacrylate, 1,4-butanediol diacrylate, 1,3-butanediol diacrylate, 1,6-hexanediol diacrylate, 1,6-hexanediol ethoxylate diacrylate, 1,6-hexanediol propoxylate diacrylate, 3-hydroxy-2,2-dimethylpropyl 3-hydroxy-2,2-dimethylpropionate diacrylate, 1,7-heptanediol diacrylate, 1,8-octanediol diacrylate, 1,9-nonanediol diacrylate, 1,10-decanediol diacrylate, diol diacrylate type compounds (CH$_2$=CH—CO—R—CO—CH=CH$_2$) such as derivatives of the above compounds, and mixtures thereof.

[Formula 2]

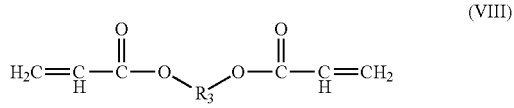

(VIII)

wherein R$_3$ is a C1~C30 alkyl group.

The bisacrylamide compound used in the above process may be represented by the following formula 3, and non-limiting examples of such bisacrylamide compounds include N,N'-methylene bisacrylamide (MDA), N,N'-ethylene bisacrylamide and mixtures thereof. The bisacrylamide compound is allowed to react with an amine compound such as 4-aminomethylpiperidine (AMPD), N-methyl ethylenediamine (MEDA) or 1-(2-aminoethyl)piperidine (AEPZ) through a conventional reaction mechanism such as the Michael reaction mechanism.

[Formula 3]

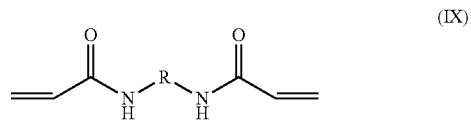

(IX)

wherein R is a C1~C20 alkyl group.

To provide the pH-sensitive poly(β-amino ester) and/or poly(amido amine), the bisacrylate compound and/or the bisacrylamide compound may be used alone or in combination. In the case of a mixture containing at least one compound, the weight ratio of the compounds forming the mixture may be controlled freely in a range of 100:0~0:100.

Additionally, there is no particular limitation in selection of the amine compound as long as the amine compound has an amine group. Preferably, a primary amine represented by the following formula 4, a secondary amine-containing diamine compound represented by the following formula 5, or a mixture thereof are used.

[Formula 4]

(X)

[Formula 5]

(XI)

wherein each of R$_1$ and R$_2$ is a C1~C20 alkyl group.

Non-limiting examples of such primary anine compounds include 3-methyl-4-(3-methylphenyl)piperazine, 4-(ethoxycarbonylmethyl)piperazine, 4-(phenylmethyl)piperazine, 4-(1-phenylethyl)piperazine, 4-(1,1-dimethoxycarbonyl) piperazine, 4-(2-(bis-(2-propenyl)amino)ethyl)piperazine, methylamine, ethylamine, butylamine, hexylamine, 2-ethylhexylamine, 2-piperidine-1-yl-ethylamine, C-aziridine-1-yl-ethylamine, 1-(2-aminoethyl)piperazine, 4-(aminomethyl) piperazine, N-methylethylenediamine, N-ethylethylenediamine, N-hexylethylenediamine, pycoliamine, adenine, etc. Non-limiting examples of such secondary amine-containing diamine compounds include piperazine, piperidine, pyrrolidine, 3,3-dimethylpiperidine, 4,4'-trimethylene dip-piperidine, N,N'-dimethyl ethylene diamine, N,N'-diethyl ethylene diamine, imidazolidine, diazepine, etc.

When preparing a pH-sensitive poly(β-amino ester) and/or poly(amido amine), the bisacrylate or bisacrylamide compound is allowed to react with the amine compound preferably in a molar ratio of 1:0.5~2.0. When the molar ratio of the amine compound is less than 0.5 or greater than 2.0, the resultant polymer has a broad molecular weight distribution and shows poor pH sensitivity, and it is difficult to control the length of a block in the resultant block copolymer.

Although there is no particular limitation in the molecular weight of the oligomer formed from at least one compound selected from the group consisting of poly(β-amino ester) and poly(amido amine), the oligomer preferably has a molecular weight of 500~20,000. If the molecular weight is less than 500, the resultant block copolymer cannot show sol-gel transition behavior depending on pH variations. On the other hand, if the molecular weight is greater than 20,000, the block copolymer cannot show temperature sensitivity.

The block copolymer according to the present invention, formed by coupling the copolymer (A) of a PEG type compound and a biodegradable polymer with the poly(β-amino ester) and/or poly(amido amine) oligomer (B) is preferably a tri- or higher block copolymer, and is more preferably a triblock or pentablock copolymer. More particularly, the block copolymer may be represented by any one of the following formulae 6~11:

[Formula 6]
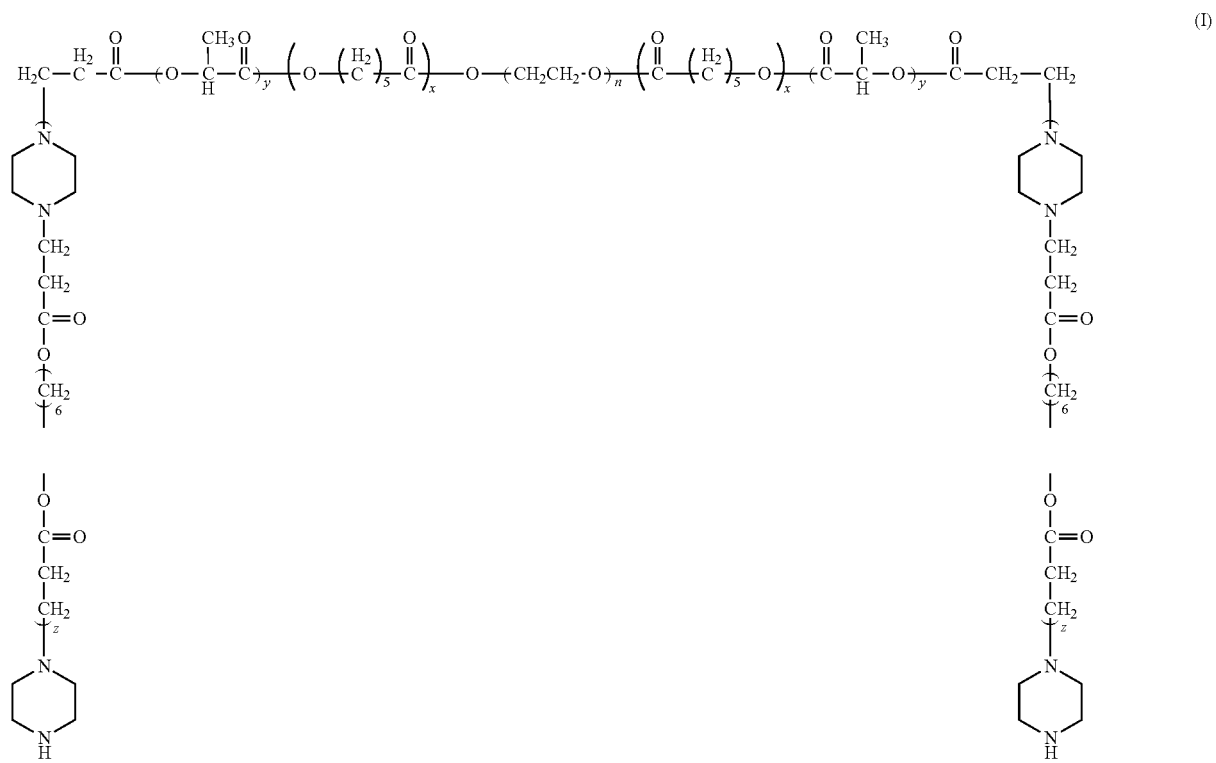
(I)
[Formula 7]
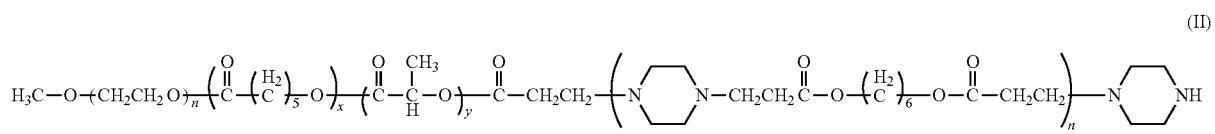
(II)
[Formula 8]
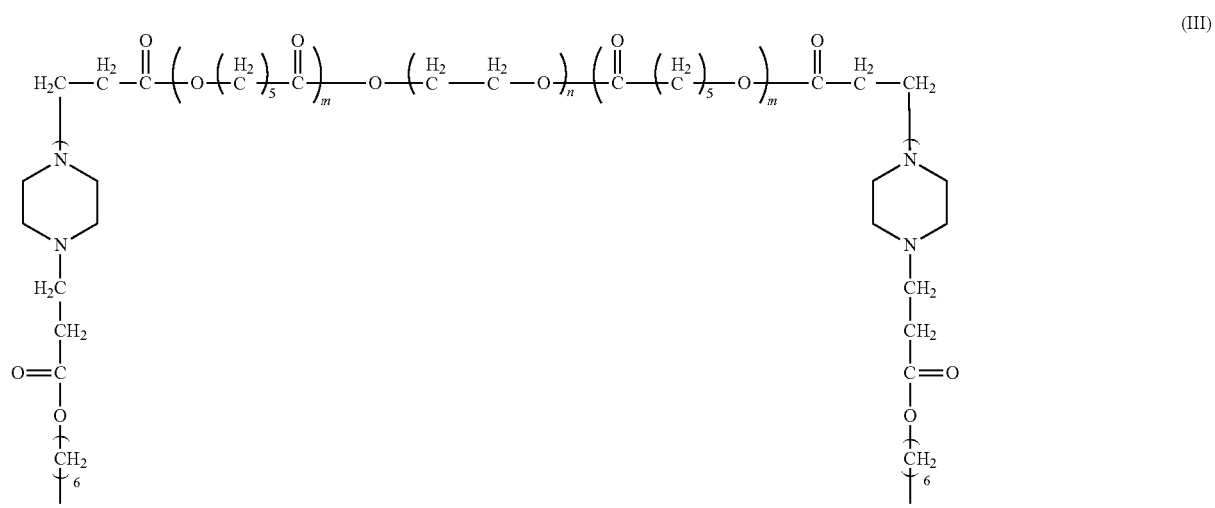
(III)

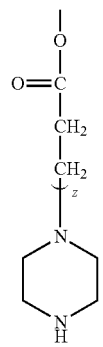 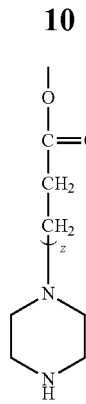

[Formula 9]

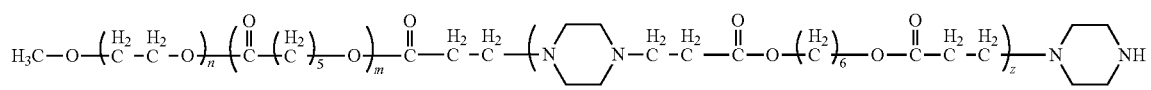

[Formula 10]

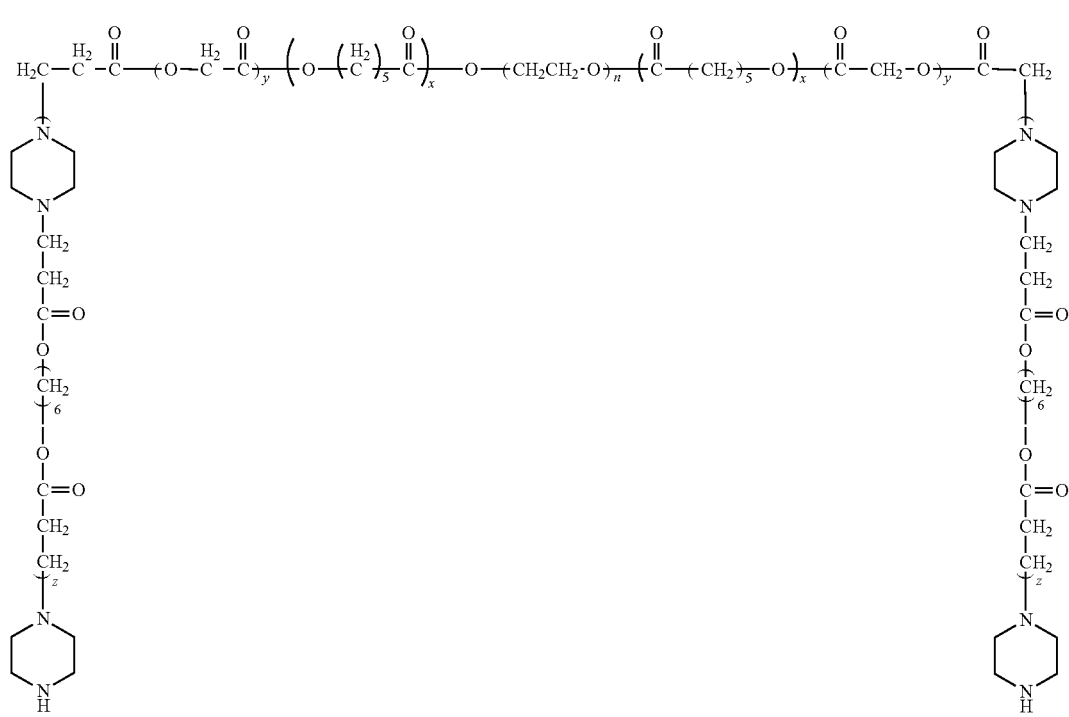

[Formula 11]

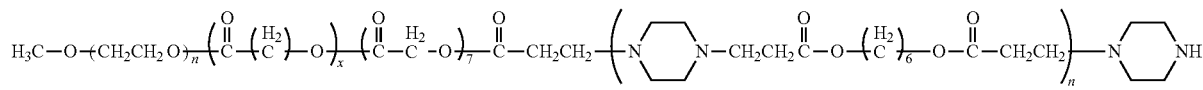

wherein each of x, y, z, n and is a natural number ranging from 1 to 10,000.

The block copolymer represented by any one of the above formulae 6~11 can form hydrogel or can maintain a sol state depending on pH variations due to its amphiphilic property and pH sensitivity. Particularly, the block copolymer according to the present invention can be used satisfactorily in various applications requiring sensitivity depending on pH variations in the body (for example, carriers for release-controlled drug delivery).

Herein, the block copolymer represented by formula 9 has a hydroxy group only at one end of the copolymer (MPEG-PCLA) of a PEG type compound and a biodegradable polyester polymer. Therefore, the hydroxy group may be substituted with an acrylate group, and thus the resultant block copolymer has a block structure coupled with β-amino ester at one side.

Although there is no particular limitation in the molecular weight of the block copolymer, it is preferable that the block copolymer has a molecular weight of 5,000 to 30,000. When the block copolymer has a molecular weight away from the above range, it is difficult to form gel due to a failure in hydrophilicity/hydrophobicity balance.

In addition to the above constitutional elements, the temperature- and pH-sensitive block copolymer according to the present invention may further comprise other components or additives, currently used in the art.

To provide the temperature- and pH-sensitive block copolymer according to the present invention by using the copolymer (A) of a PEG type compound and a biodegradable polymer and a poly(β-amino ester) and/or poly(amido amine) type oligomer, it is possible to utilize any one method of the polymerization methods known to one skilled in the art, including Michael reaction, radical polymerization, cationic polymerization, anionic polymerization, polycondensation, or the like.

In one embodiment of the method for preparing the temperature- and pH-sensitive block copolymer according to the present invention, the method comprises the steps of: (a) polymerizing a PEG type compound with a biodegradable polymer to form a copolymer (A); (b) introducing an acrylate group into the copolymer (A) of PEG with the biodegradable polymer; (c) and coupling the resultant copolymer (A) with at least one oligomer selected from the group consisting of poly(β-amino ester) and poly(amido anine).

First, a PEG type compound is polymerized with a biodegradable polyester polymer to form a copolymer, and the reaction may be represented by the following Reaction Scheme 1:

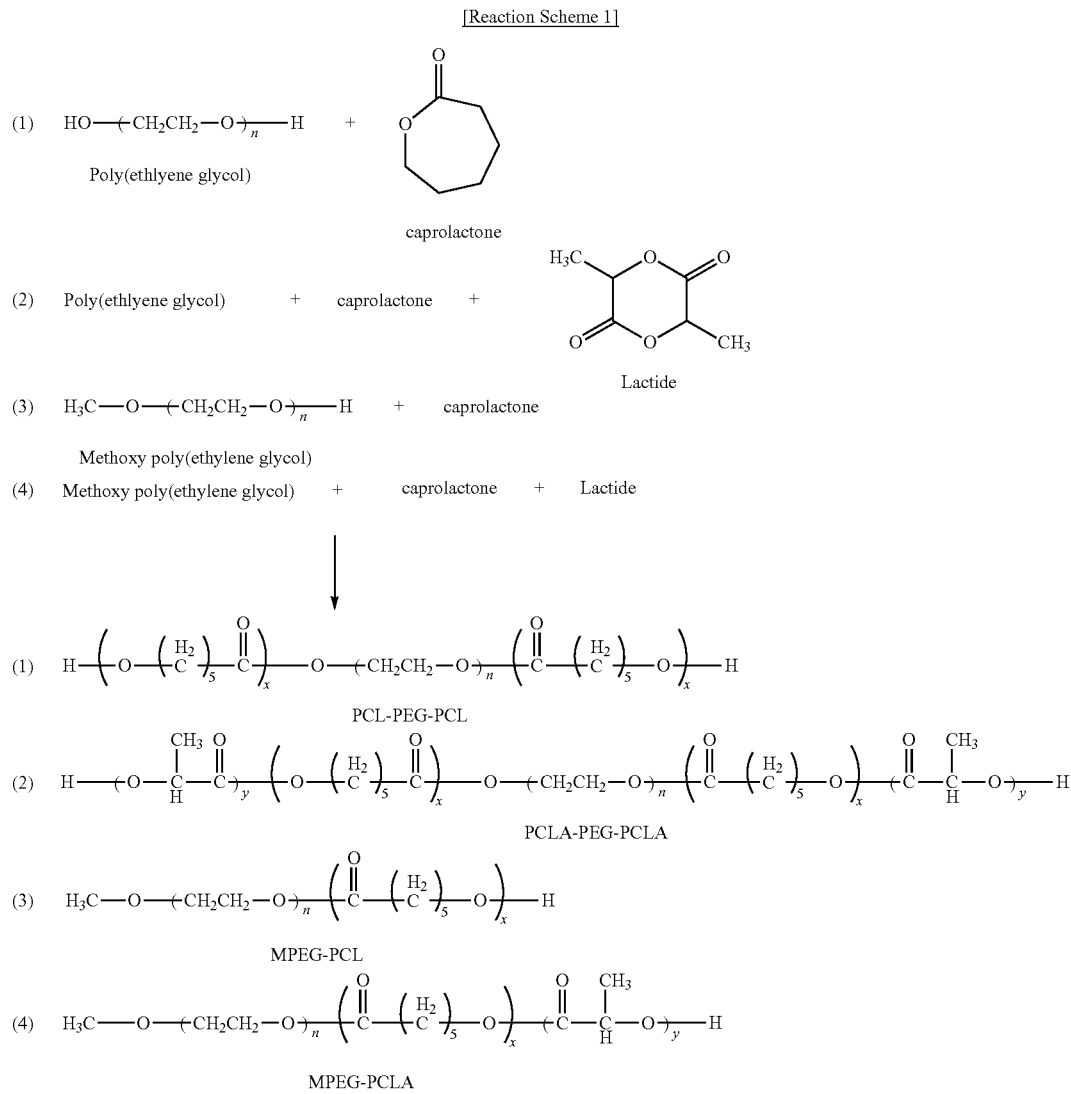

Copolymerization of a PEG type compound with a biodegradable polyester polymer is preferably carried out via a ring-opening polymerization reaction. Herein, polymerization temperature and time may be controlled in a range known to one skilled in the art, and the polymerization is carried out preferably at a temperature of 130~150° C. for 12~48 hours. Additionally, a catalyst may be used for accelerating the reaction, and particular examples of the catalyst that may be used include stannous octoate, stannous chloride, metal oxides ($GeO_2$, $Sb_3O_2$, $SnO_2$, etc.), aluminum triisopropoxide, $CaH_2$, Zn, lithium chloride, tris(2,6-di-tert-butylphenolate), or the like. Further, it is possible to control the molecular weight and type of the biodegradable polymer in order to change the hydrophobicity.

The step of introducing an acrylate group into the copolymer formed by the ring-opening polymerization of PEG is preferably carried out by way of the reaction between the terminal hydroxy group (—CH) of the polyethylene glycol-biodegradable polyester copolymer and the halogen of an acryoyl chloride. The reaction may be represented by the following Reaction Scheme 2:

values, and thus the multiblock copolymer can show temperature sensitivity and pH sensitivity at the same time.

Actually, it was possible to determine the block copolymer according to the present invention, for example, methoxy-polyethylene glycol-polycaprolactone-beta amino ester (MPEG-PCL-β-amino ester) for the introduction of each functional group and for the reaction of terminal groups by using FT-IR and $^1$H-NMR. It was also possible to determine that the block copolymer according to the present invention

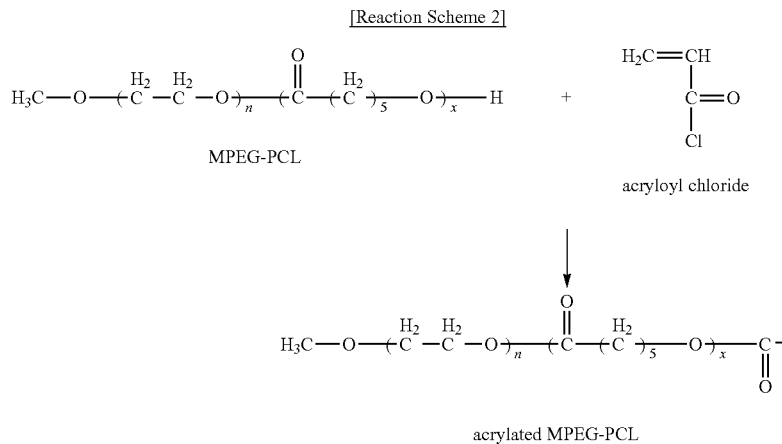

The temperature and pH sensitive multiblock copolymer may be obtained from the copolymer (A) of PEG with the biodegradable polyester polymer, into which an acrylate group is introduced, via the coupling of an amine group (—NH or —NH$_2$) with an acrylate group (—CH=CH$_2$). The coupling reaction may be represented by the following Reaction Scheme 3:

has a structure formed by coupling of a copolymer of a PEG type compound and a biodegradable polymer with a β-amino ester oligomer, through an increase in the molecular weight of the block copolymer, as observed by GPC (gel permeation chromatography).

Meanwhile, it was also possible to determine the reaction degree, molecular weight and block length of the methoxy-

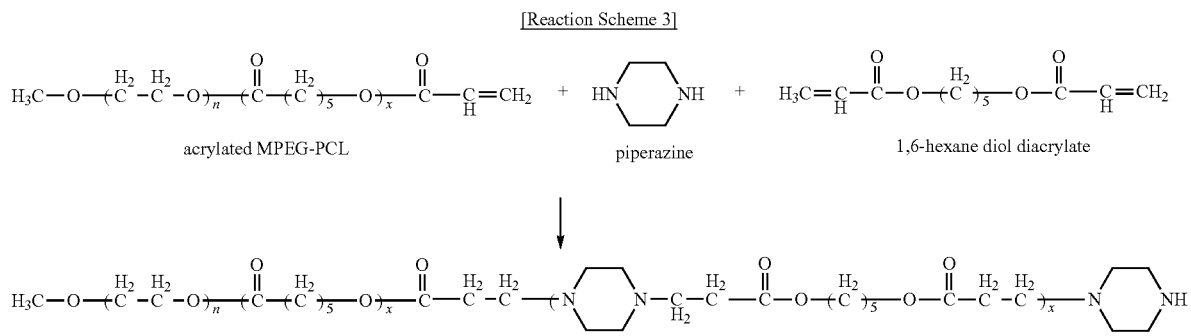

There is no particular limitation in the reaction temperature and time of the above step, and the block copolymer may be obtained in a conventional manner known to one skilled in the art.

A primary amine compound and a secondary amine-containing diamine compound, used for the preparation of a poly(β-amino ester) oligomer, as well as a diol diacrylate type compound that reacts with the above amine compound to form a β-amino ester block may be subjected to the same process as described above.

The multiblock copolymer obtained as described above has a combination of a hydrophilic block, a hydrophobic block and a poly(β-amino ester) and/or poly(amido if amine) oligomer that shows an ionization degree varied with pH polyethylene glycol-polycaprolactone-amido amine (MPEG-PCL-amido amine) block copolymer, which uses poly(amido amine) alone as a pH-sensitive compound instead of poly(O-amino ester), and the mixed block copolymer, i.e., methoxypolyethylene glycol-polycaprolactone-β-amino ester-amido amine (MPEG-PCL-β-amino ester-amido amine) copolymer, which uses a mixture of poly(β-amino ester) and poly(amido amine) having pH sensitivity and a different biodegradation rate so as to control the biodegradation rate in the human body, by using FT-IR, $^1$H-NMR and GPC. Additionally, in order to determine the pH sensitivity of the block copolymer, sol-gel transition characteristics of the block copolymer were measured by varying pH at a certain temperature. After the measurement, it was shown that the multiblock copolymer according to the present invention has pH sensitivity.

According to another aspect of the present invention, there is provided a polymeric hydrogel type drug composition, which comprises: (a) the temperature and pH sensitive block copolymer; and (b) a physiologically active substance that can be encapsulated with the block copolymer.

Any physiologically active substances can be used and can be encapsulated with the polymeric hydrogel type block copolymer according to the present invention with no particular limitation. Non-limiting examples of such active substances include anti-cancer agents, antibacterial agents, steroids, antiphlogistic analgesic agents, sexual hormones, immunosuppressants, antiviral agents, anesthetic agents, antiemetic agents, antihistamine agents, etc. In addition to the above active substances, the drug composition according to the present invention may further comprise conventional additives such as vehicles, stabilizers, pH adjusting agents, antioxidants, preservatives, binders and disintegrating agents. The composition may further comprise other conventional additives, solvents, or the like.

Additionally, the polymeric hydrogel type drug composition may be provided as oral formulation or parenteral formulation. Particularly, the polymeric hydrogel type drug composition may be provided for intravenous, intramuscular or subcutaneous injection.

According to still another aspect of the present invention, there is provided a carrier for drug delivery or medical diagnosis, which comprises the temperature and pH sensitive block copolymer. Herein, any materials are encapsulated with the block copolymer, as long as they are for treatment, prevention or diagnosis of diseases.

According to yet another aspect of the present invention, there is provided use of a copolymer comprising: (a) at least one hydrophilic block; (b) at least one biodegradable block having hydrophobicity varied with temperatures; and (c) at least one unit having an ionization degree varied with pH values, as a carrier for drug delivery or medical diagnosis.

Herein, the unit (c) having an ionization degree varied with pH values may be at least one oligomer (B) selected from the group consisting of poly(β-amino ester) and poly(amido amine), but is not limited thereto. Additionally, the hydrophilic block (a) and the biodegradable block (b) having different hydrophobicity depending on temperature variations are the same as defined above. Also, it is possible to use other hydrophilic and/or hydrophobic materials known to one skilled in the art.

BRIEF DESCRIPTION OF THE DRAWINGS

The foregoing and other objects, features and advantages of the present invention will become more apparent from the following detailed description when taken in conjunction with the accompanying drawings in which.

MODE FOR THE INVENTION

Figure 1:
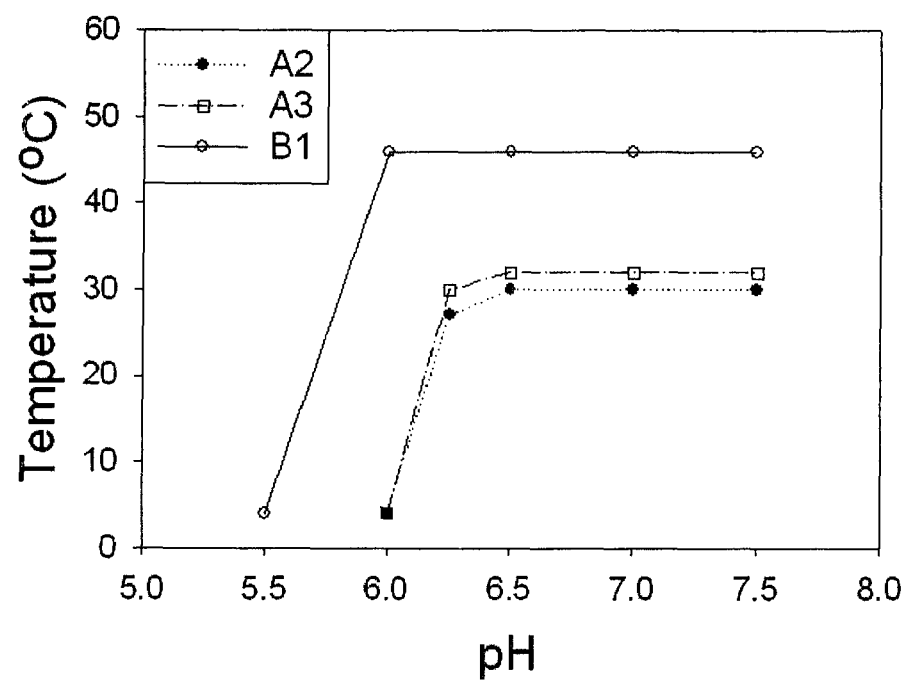
FIG. 1 is a graph showing the sol-gel transition behavior of the triblock copolymer according to Example 1, depending on temperature and pH variations, the triblock copolymer comprising a pH-sensitive polyethylene glycol type compound, a biodegradable polycaprolactone compound and a pH-sensitive biodegradable poly(β-amino ester) compound.

Reference will now be made in detail to the preferred embodiments of the present invention. It is to be understood that the following examples are illustrative only and the present invention is not limited thereto.

Examples 1~6

Preparation of Temperature and pH Sensitive Block Copolymer

Example 1

Preparation of Polyethylene Glycol-Biodegradable Polyester Polymer (Polycaprolactone)-Poly(β-amino ester) Triblock Copolymer (PAE)

First, 10 g of polyethylene glycol methyl ether (MPEG, Mn=2000, 5000) and 0.2 g of stannous octoate (catalyst) were introduced into a reactor and the reaction mixture was dried under vacuum at 110° C. for 4 hours to remove water. After cooling the dried reaction mixture, 6.0 g (5.576 ml) of ε-caprolactone as a biodegradable polyester polymer were added thereto under nitrogen atmosphere, and then the resultant reaction mixture was heated gradually to 135° C. under nitrogen atmosphere and subjected to polymerization for 24 hours. It was possible to obtain an MPEG-PCL block copolymer having a desired molecular weight by controlling the amount of MPEG and the addition amount of ε-caprolactone so as to control the molecular weight. Stannous octoate was used in an amount of 0.5 wt % based on the amount of MPEG. After the completion of the reaction, the reaction mixture was cooled to room temperature, and a small amount of methylene chloride was added thereto to dissolve the reactants. The reaction mixture was added to an excessive amount of ethyl ether and precipitated therein to remove unreacted materials. Then, the product, from which unreacted materials were removed, was dried under vacuum at 40° C. for 48 hours. By doing so, a block copolymer (MPEG-PCL) of polyethylene glycol with ε-caprolactone (biodegradable polyester polymer compound) was obtained with a yield of 85% or more.

Next, 4 g of the MPEG-PCL block copolymer obtained as described above were introduced into a reactor and was dried at 85° C. under vacuum to remove water. After cooling the reaction mixture to room temperature, methylene chloride was added thereto under nitrogen atmosphere to dissolve the block copolymer. Then, triethyl amine was added to the reaction mixture in a molar ratio of 1.5:1 based on the amount of the MPEG-PCL block copolymer in order to remove HCl as a byproduct, and the dissolved product was cooled to 10° C. Then, acryloyl chloride was added dropwise to the cooled product in a molar ratio of 1.5:1 to obtain a block copolymer having a double bond. The above reaction was carried out in an ice-bath under nitrogen atmosphere for 24 hours. After the completion of the reaction, the reaction mixture was precipitated in ethyl ether to remove unreacted materials, filtered and dried under vacuum at room temperature to obtain a polyethylene glycol-polycaprolactone-acrylate block copolymer (MPEG-PCL-A) having a double bond at its terminal group, with a yield of 80% or more.

The block copolymer (MPEG-PCL-A) having a double bond, obtained as described above, was introduced into a reactor at room temperature, and chloroform was added thereto to dissolve the block copolymer. To form a β-amino ester block, piperazine and 1,6-hexanediol diacrylate were added thereto at room temperature and dissolved. Then, the reaction mixture was allowed to react at 50° C. for 48 hours. While filing the molar ratio of piperazine:1,6-hexanediol diacrylate to 1:1, equivalent ratio of the MPEG-PCL block copolymer, piperazine and 1,6-hexanediol diacrylate was controlled to obtain a triblock copolymer having a desired molecular weight. After the completion of the reaction, the reaction mixture was precipitated in an excessive amount of ethyl ether to remove unreacted materials, and then the product was filtered to obtain an MPEG PCL-poly(β-amino ester) triblock copolymer with a yield of 70% or more.

Example 2

Temperature- and pH-Sensitive Pentablock Copolymer

Example 1 was repeated to obtain triblock copolymers (PCLA-PEG-PCLA) comprising ε-caprolactone, D,L-lactide and polyethylene glycol and having various molecular weights, except that polyethylene glycol (PEG, Mn=1500, 1750, 2000) was used instead of polyethylene glycol ether and DL-lactide was further added besides ε-caprolactone. Each product was obtained with a yield of 91% or more.

The PCLA-PEG-PCLA block copolymer obtained as described above was introduced into a reactor and was dried at 85° C. under vacuum to remove water. After cooling the reaction mixture to room temperature, methylene chloride was added thereto under nitrogen atmosphere to dissolve the block copolymer. Then, triethyl amine was added to the reaction mixture in a molar ratio of 3:1 based on the amount of the block copolymer in order to remove HCl as a byproduct, and the dissolved product was cooled to 10° C. Then, acryloyl chloride was added dropwise to the cooled product in a molar ratio of 3:1 to obtain a block copolymer having a double bond. The above reaction was carried out in an ice-bath under nitrogen atmosphere for 24 hours. After the completion of the reaction, the reaction mixture was precipitated in ethyl ether to remove unreacted materials, filtered and dried under vacuum at room temperature to obtain poly(ε-caprolactone/D,L-lactide-polyethylene glycol-poly(ε-caprolactone/D,L-lactide acrylate block copolymer (acrylated PCLA-PEG-PCLA) having a double bond at its terminal group, with a yield of 80% or more.

The block copolymer (acrylated PCLA-PEG-PCLA) having a double bond, obtained as described above, was introduced into a reactor at room temperature, and chloroform was added thereto to dissolve the block copolymer. To form β-amino ester block, 4,4'-trimethylene dipiperazine and 1,4-butanediol diacrylate were added thereto at room temperature and dissolved. Then, the reaction mixture was allowed to react at 50° C. for 48 hours. While filing the molar ratio of 4,4'-trimethylene dipiperazine to 1,4-butanediol diacrylate to 1:1, equivalent ratio of the triblock copolymer, 4,4'-trimethylene dipiperazine and 1,4-butanediol diacrylate was controlled to obtain a pentablock copolymer having a desired molecular weight. After the completion of the reaction, the reaction mixture was precipitated in an excessive amount of ethyl ether to remove unreacted materials, and then the product was filtered to obtain a poly(β-amino ester)-PCLA-PEG-PCLA-poly(β-amino ester) pentablock copolymer with a yield of 70% or more.

Meanwhile, molecular weight of MPEG, molecular weight of the biodegradable polymer (PCLA), molar ratio of MPEG to the biodegradable polymer, and molecular weight of poly (β-amino ester) were varied as shown in the following Table 1 to provide triblock copolymers (PCLA-PEG-PCLA) and pentablock copolymers (poly(β-amino ester)-PCLA-PEG-PCLA-poly(β-amino ester)) having various molecular weights. Molecular weight of each block copolymer is also shown in Table 1. In Table 1, PDI refers to a polydispersity index as measured by GPC, and is used to determine whether the block copolymer has a uniform molecular distribution or not. As PDI of a block copolymer decreases, the block copolymer has a more uniform molecular weight distribution. On the other hand, as PDI of a block copolymer increases, the block copolymer has a less uniform molecular weight distribution.

TABLE 1

|  | PCLA-PEG-PCLA (Mn$^a$) | PEG/PCLA (wt ratio) | PEG (Mn) | PAE$^b$ | PDI |
|---|---|---|---|---|---|
| C1 | 1530-1500-1530 | 1/2.04 | 1500 | 1335 | 1.40 |
| C2 | 1636-1500-1636 | 1/2.2 | 1500 | 1383 | 1.43 |
| C3 | 1885-1500-1885 | 1/2.5 | 1500 | 1340 | 1.44 |
| C4 | 1885-1500-1885 | 1/2.5 | 1500 | 820 | 1.32 |
| C5 | 1885-1500-1885 | 1/2.5 | 1500 | 1764 | 1.45 |
| C6 | 1885-1500-1885 | 1/2.5 | 1500 | 2018 | 1.48 |
| C7 | 1885-1500-1885 | 1/2.5 | 1500 | 2566 | 1.52 |
| C8 | 1726-1750-1726 | 1/2.0 | 1750 | 1297 | 1.40 |
| C9 | 2050-2000-2050 | 1/2.05 | 2000 | 1299 | 1.42 |

$^a$Determined by supplier,
$^b$1H-NMR,
$^c$GPC

Example 3

Example 2 was repeated to provide a pentablock copolymer of poly(β-amino ester-amido amine)-PCLA-PEG-PCLA-poly(β-amino ester-amido amine) having a molecular weight of 6800, except that 1,6-hexanediol diacrylate and N,N'-methylene bisacrylamide were used in a weight ratio of 80:20 instead of 1,4-butanediol diacrylate.

Example 4

Example 2 was repeated to provide a pentablock copolymer of poly(β-amino ester-amido amine)-PCLA-PEG-PCLA-poly(β-amino ester-amido amine) having a molecular weight of 6500, except that 1,6-hexanediol diacrylate and N,N'-methylene bisacrylamide were used in a weight ratio of 60:40 instead of 1,4-butanediol diacrylate.

Example 5

Example 2 was repeated to provide a pentablock copolymer of poly(β-amino ester-amido amine)-PCLA-PEG-PCLA-poly(β-amino ester-amido amine) having a molecular weight of 6500, except that 1,6-hexanediol diacrylate and N,N'-methylene bisacrylamide were used in a weight ratio of 40:60 instead of 1,4-butanediol diacrylate.

Example 6

Example 2 was repeated to provide a pentablock copolymer of poly(β-amino ester-amido amine)-PCLA-PEG-PCLA-poly(β-amino ester-amido amine) having a molecular weight of 6500, except that 1,6-hexanediol diacrylate and N,N'-methylene bisacrylamide were used in a weight ratio of 20:80 instead of 1,4-butanediol diacrylate.

Example 7

Example 2 was repeated to provide a pentablock copolymer of poly(amido amine)-PCLA-PEG-PCLA-poly(amido amine) having a molecular weight of 6500, except that 1,6-hexanediol diacrylate and N,N'-methylene bisacrylamide were used in a weight ratio of 0:100 instead of 1,4-butanediol diacrylate.

Comparative Example 1~3

Comparative Example 1

Example 2 was repeated to provide a pentablock copolymer of poly(amido amine)-PCLA-PEG-PCLA-poly(amido amine) having a molecular weight of 5000, except that the oligomer formed from poly(amido amine) had a molecular weight of less than 500. However, the copolymer showed no sol-gel transition behavior under the body temperature conditions (37° C., pH 7.4).

Comparative Example 2

Example 2 was repeated to provide a pentablock copolymer of poly(amido amine)-PCLA-PEG-PCLA-poly(amido amine) having a molecular weight of 25500, except that the oligomer formed from poly(amido amine) had a molecular weight of 21000. However, the copolymer showed no sol-gel transition behavior under the body temperature conditions (37° C., pH 7.4).

Comparative Example 3

Example 2 was repeated to provide a pentablock copolymer of poly(β-amino ester-amido amine)-PCLA-PEG-PCLA-poly(β-amino ester-amido amine) having a molecular weight of 5000, except that MPEG4000 was used instead of MPEG2000. However, the copolymer showed no sol-gel transition behavior under the body temperature conditions (37° C., pH 7.4).

Comparative Example 4

Example 2 was repeated to provide a pentablock copolymer of poly(β-amino ester-amido amine)-PCLA-PEG-PCLA-poly(β-amino ester-amido anine) having a molecular weight of 7700, except that MPEG6000 was used instead of MPEG5000. However, it was difficult to form a gel from the copolymer, because the copolymer had imbalanced hydrophilic/hydrophobic blocks and could not allow a sol-gel transition due to the use of MPEG having a high molecular weight.

Experimental Example 1

Evaluation for Sol-Gel Transition Behavior Depending on pH Variations (1)

The following experiment was performed to evaluate sol-gel transition behavior of the block copolymer according to the present invention depending on temperature and pH variations.

Figure 2:
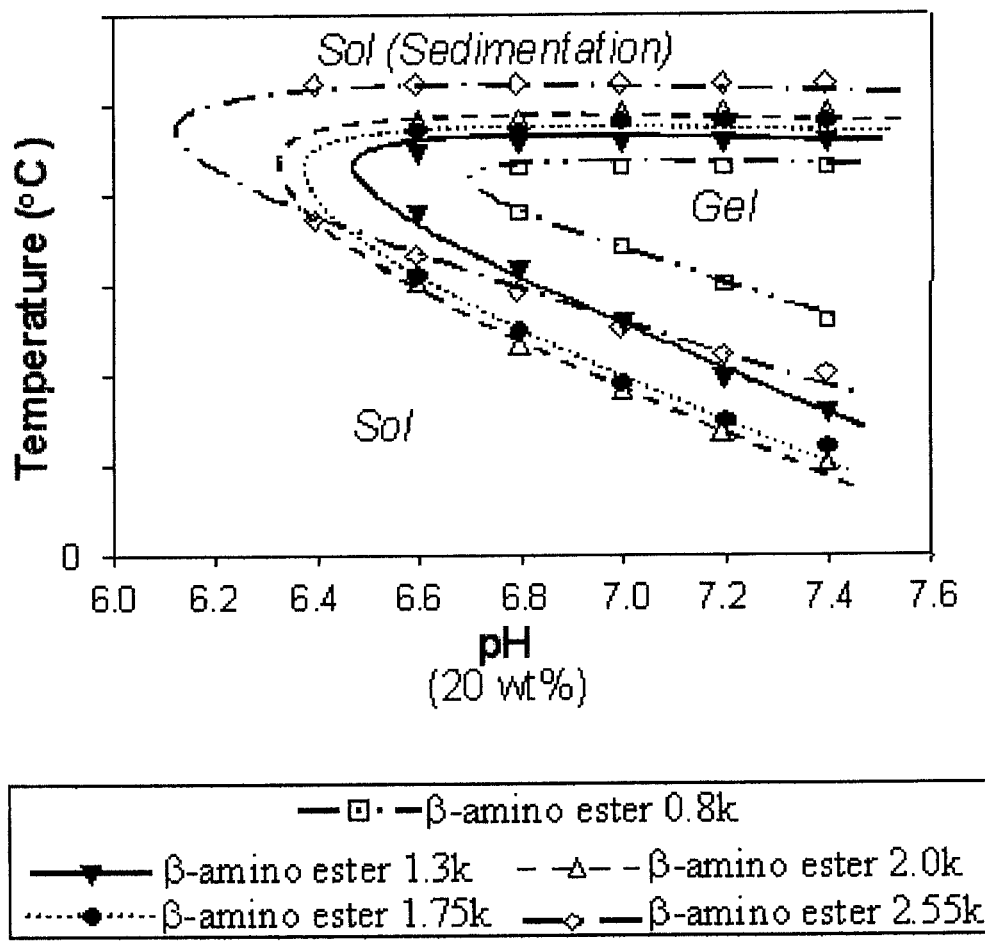
FIG. 2 is a graph showing the sol-gel transition behavior of the pentablock copolymer according to Example 2, depending on temperature and pH variations, the pentablock copolymer comprising a polyethylene glycol type compound, polycaprolactone compound and polylactic acid compound, and a poly(β-amino ester) compound.
Figure 3:
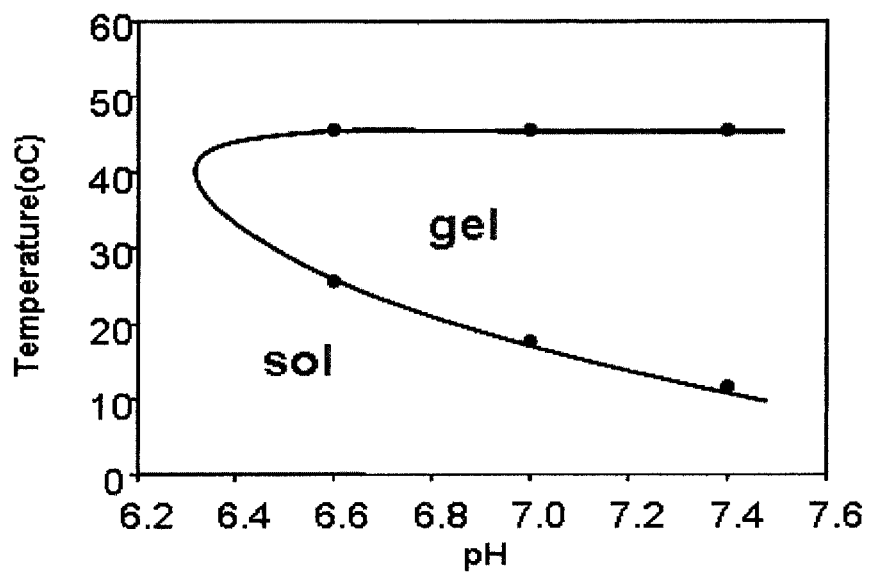
FIG. 3 is a graph showing the sol-gel transition behavior of the pentablock copolymer according to Example 4, depending on pH variations, the pentablock copolymer comprising a polyethylene glycol type compound, polycaprolactone compound and polylactic acid compound, and poly(β-amino ester) and poly(amido amine) mixed in a weight ratio of 60:40.

The triblock copolymer (MPEG-PCL-β-amino ester) according to Example 1, the pentablock copolymer according to Example 2, and the pentablock copolymer according to Example 4 were added to a buffer solution, in an amount of 30 wt %, 20 wt % and 30 wt %, respectively, to dissolve each block copolymer. Then, each block copolymer solution was titrated with NaOH solution to a pH level of 5.5, 6.0, 6.5, 7.0 and 7.5. After each block copolymer solution having a different pH was heated by 2° C. so that the solution was in an equilibrium state at a constant temperature for 10 minutes, each solution was tilted to determine sol-gel transition behavior of each block copolymer. FIGS. 1-3 show the sol-gel transition behavior of each block copolymer depending on temperature and pH variations.

After the evaluation, it was shown that the block copolymer according to the present invention allowed reversible sol-gel transition behavior depending on pH variations as well as temperature variations, due to a change in the ionization degree of the poly(β-amino ester) type oligomer depending on pH variations and a change in the hydrophobicity of the biodegradable polymer depending on temperature variations (see FIGS. 1-3). Particularly, the block copolymer according to the present invention shows reversible sol-gel transition behavior under the same conditions as the human body (37° C., pH 7.4). Therefore, it is expected that the block copolymer according to the present invention has industrial applicability as a drug carrier.

Experimental Example 2

Evaluation for Sol-Gel Transition Behavior Depending on pH Variations (2)

The block copolymer according to the present invention was prepared under various conditions to provide various kinds of block copolymers. Then, the block copolymers were evaluated for their sol-gel transition behavior depending on temperature and pH variations.

The triblock copolymer (MPEG-PCL-PAE) according to Example 1 was modified by varying the molecular weight of MPEG and the molar ratio of MPEG to PCL as shown in Table 2 to provide triblock copolymers having various molecular weights. Then, each triblock copolymer was evaluated for its sol-gel transition behavior. The results are shown in the following Table 2.

After the experiment, A1 and A4 showed no sol-gel transition behavior. This results from the imbalanced molecular weight ratio of MPEG-PCL-PAE. In other words, it is thought that A1 still shows a sol state even if the temperature and pH are varied due to the small molecular weight of PCL. On the contrary, it is thought that A4 cannot show sol-gel transition behavior because it has too high molecular weight to be dissolved in water. It can be expected that the temperature dependence and pH dependence of a pH-sensitive block and the molecular weight of a hydrophilic MPEG block should be considered in addition to the molecular weight ratio and the block ratio of MPEG-PCL, in order to provide a temperature- and pH-sensitive block copolymer that shows reversible sol-gel transition behavior under the body temperature and pH conditions.

Therefore, it can be seen from the above results that the temperature- and pH-sensitive block copolymer hydrogel according to the present invention can be obtained not by a simple combination of a hydrophilic block, a hydrophobic block and a pH-sensitive block but by controlling the molecular weight of each constitutional element, molar ratio of constitutional elements and molar ratio of blocks to optimal conditions. Additionally, it is possible to design a medical drug carrier that requires various conditions by such controlling technique and to obtain a commercially available drug carrier.

TABLE 2

| Ex. 1 | MPEG$_{a)}$ | MPEG-PCL$_{b)}$ | MPEG-PCL-PAE$_{c)}$ | PDI$_{c)}$ | Sol-gel phase transition |
|---|---|---|---|---|---|
| A1 | 2000 | 2898 | 3495 | 1.2 | X |
| A2 |  | 3124 | 3751 | 1.2 | C |
| A3 |  | 3467 | 3991 | 1.3 | C |
| A4 |  | 3893 | 4451 | 1.3 | X |
| B1 | 5000 | 6328 | 7175 | 1.3 | C |

$_{a)}$Determined by supplier,
$_{b)}$$^1$H-NMR,
$_{c)}$GPC

Experimental Example 3

Evaluation for Biodegradation Rate of Block Copolymers Depending on pH Variations The following experiment was carried out to observe variations in the molecular weight of the pH-sensitive block copolymer hydrogel according to the present invention, after its biodegradation at a specific pH value.

The copolymer according to Example 2 using poly(β-amino ester), which has a relatively high biodegradation rate due to ester groups present in the backbone, and the copolymers according to Examples 3~7 using poly(amido anine), which has a relatively low biodegradation rate due to amide groups present in the backbone, were measured for their molecular weights with time at pH 7.4. After the measurement, it could be seen that the block copolymer according to Example 2 showed a relatively high biodegradation rate as determined by the molecular weight reduced to ½ of the original molecular weight in a short time of 30 hours or less. On the contrary, the block copolymer hydrogels according to Examples 3~7 showed a relatively low biodegradation rate (see FIG. 4).

Figure 4:
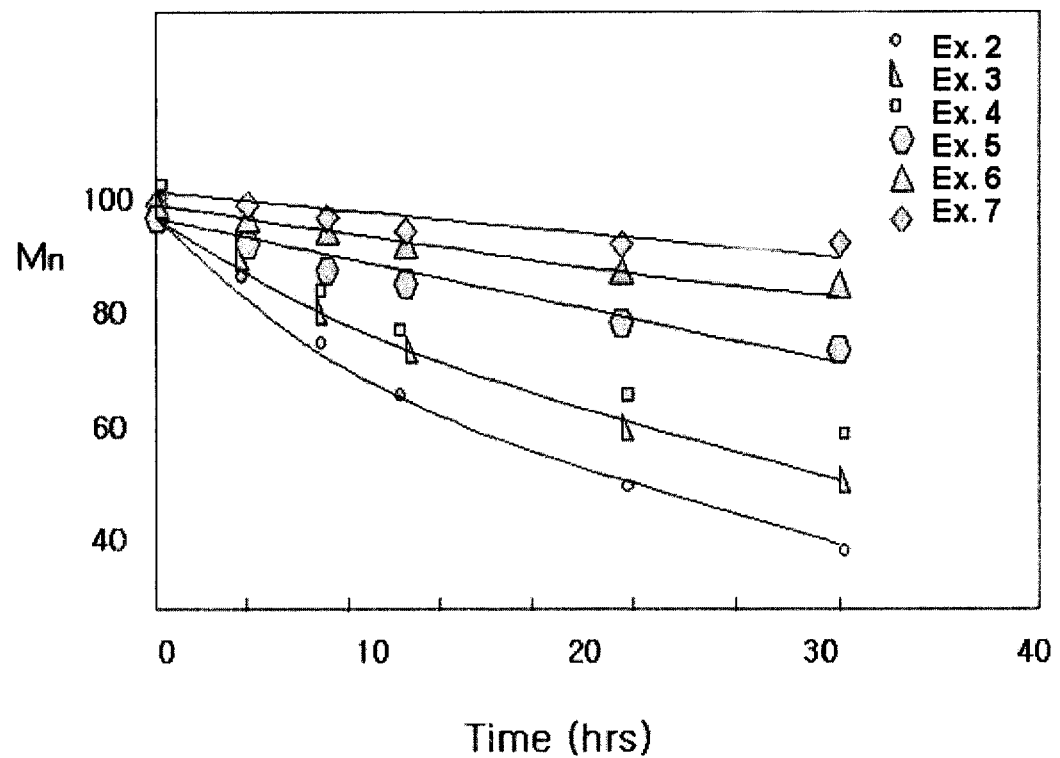
FIG. 4 is a graph showing variations in the molecular weight of each of the block copolymers as a function of time at pH 7.4 according to Examples 2 to 7.

Additionally, after measuring the molecular weight of each of the block copolymer hydrogels according to Examples 4~6 with time at a specific pH, it could be seen that it was possible to control the biodegradation rate of the hydrogel in the body by controlling the amount of the poly(β-amino ester) and that of the poly(amido amine), forming the block copolymer hydrogel, and the molar ratio thereof (see FIG. 4).

Therefore, it could be seen from the above experimental results that it was possible to design the temperature- and pH-sensitive block copolymer according to the present invention so as to show and continuously maintain a desired biodegradation rate by using, as a kind of poly(β-amino acid), a copolymer with poly(amido amine) that has a relatively low biodegradation rate in the body.

INDUSTRIAL APPLICABILITY

As can be seen from the foregoing, the block copolymer according to the present invention shows pH sensitivity as well as temperature sensitivity, and thus can solve the problems occurring in conventional temperature-sensitive block copolymers according to the prior art. Additionally, the block copolymer according to the present invention can form more stable hydrogel at an adequate temperature and pH, and can solve the problem related to the in vivo stability. Therefore, the block copolymer according to the present invention can be used for various applications in the medical field, in particular, as a drug carrier for drug delivery.

While this invention has been described in connection with what is presently considered to be the most practical and preferred embodiment, it is to be understood that the invention is not limited to the disclosed embodiment and the drawings. On the contrary, it is intended to cover various modifications and variations within the spirit and scope of the appended claims.

The invention claimed is:
1. A block copolymer formed of:
   (a) a copolymer block (A) of a polyethylene glycol and a biodegradable polyester polymer; and
   (b) a poly(β-amino ester) oligomer block (B), wherein the biodegradable polyester polymer is at least one polymer selected from the group consisting of polylactide, polyglycolide, polycaprolactone, poly(caprolactone-lactide)

random copolymer, poly(caprolactone-glycolide) random copolymer, and poly(lactide-glycolide) random copolymer, wherein the copolymer block (A) has an acrylate group at a terminal end of the biodegradable polyester polymer;

wherein the poly(β-amino ester) oligomer block (B) is coupled to only the biodegradable polyester polymer in the copolymer block (A) by a directed bond at the acrylate group terminal of the biodegradable polyester polymer; and wherein the block copolymer shows an reversible sol-gel transition by a change in temperature and pH, and forms a hydrogel by sol-gel transition at a pH ranging from 7.2 to 7.4 and maintains a sol state at a pH ranging from 6.0 to 7.2.

2. The block copolymer according to claim 1, which has both temperature sensitivity and pH sensitivity.

3. The block copolymer according to claim 1, wherein the polyethylene glycol is a compound represented by the following Formula 1:

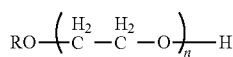

Formula 1 wherein R is a hydrogen atom or a C1-C5 alkyl group, and n is a natural number ranging from 11 to 45.

4. The block copolymer according to claim 1, wherein the polyethylene glycol has a molecular weight of 500 to 5,000.

5. The block copolymer according to claim 1, wherein the polyethylene glycol and the biodegradable polyester polymer have a molecular weight ratio of 1:1-3.

6. The block copolymer according to claim 1, wherein the copolymer (A) of the polyethylene glycol with the biodegradable polyester polymer has at least one substituent selected from the group consisting of a primary amine group, a secondary amine group and a double bond, the substituent being capable of reacting with the oligomer (B) poly(β-amino ester).

7. The block copolymer according to claim 1, wherein the poly(β-amino ester) contains a tertiary amine group that is ionized at a pH level of 7.2 or less.

8. The block copolymer according to claim 1, wherein the oligomer (B) is formed by polymerization of:

(a) a bisacrylate or bisacrylamide compound; and
(b) an amine compound.

9. The block copolymer according to claim 8, wherein the bisacrylate compound is at least one compound selected from the group consisting of ethylene glycol diacrylate, 1,4-butanediol diacrylate, 1,3-butanediol diacrylate, 1,6-hexanediol diacrylate, 1,6-hexanediol ethoxylate diacrylate, 1,6-hexanediol propoxylate diacrylate, 3-hydroxy-2,2-dimethylpropyl 3-hydroxy-2,2-dimethylpropionate diacrylate, 1,7-heptanediol diacrylate, 1,8-octanediol diacrylate, 1,9-nonanediol diacrylate and 1,10-decanediol diacrylate; and the bisacrylamide compound is at least one compound selected from the group consisting of N,N'-methylene bisacrylamide and N,N'-ethylene bisacrylamide.

10. The block copolymer according to claim 8, wherein the amine compound is a primary amine compound or a secondary amine-containing diamine compound.

11. The block copolymer according to claim 10, wherein the primary amine compound is at least one compound selected from the group consisting of 3-methyl-4-(3-methylphenyl)piperazine, 3-methylpiperazine, 4-(bis-(fluorophenyl)methyl)piperazine, 4-(ethoxycarbonylmethyl)piperazine, 4-(phenylmethyl)piperazine, 4-(1-phenylethyl)piperazine, 4-(1,1-dimethoxycarbonyl)piperazine, 4-(2-(bis-(2-propenyl)amino)ethyl)piperazine, methylamine, ethylamine, butylamine, hexylamine, 2-ethylhexylamine, 2-piperidine-1-yl-ethylamine, C-aziridine-1-yl-ethylamine, 1-(2-aminoethyl)piperazine, 4-(aminomethyl)piperazine, N-methylethylenediamine, N-ethylethylenediamine, N-hexylethylenediamine, pycoliamine and adenine; and the secondary amine-containing diamine compound is at least one compound selected from the group consisting of piperazine, piperidine, pyrrolidine, 3,3-dimethylpiperidine, 4,4'-trimethylene dipiperidine, N,N'-dimethyl ethylene diamine, N,N'-diethyl ethylene diamine, imidazolidine and diazepine.

12. The block copolymer according to claim 8, wherein the bisacrylate or bisacrylamide compound (a) and the amine compound (b) are used in a molar ratio of 1:0.5-2.0.

13. The block copolymer according to claim 1, wherein the poly(β-amino ester) has a molecular weight of 500-20,000.

14. The block copolymer according to claim 8, wherein the oligomer (B) comprises 1,6-hexanediol diacrylate and N,N'-methylene bisacrylamide, mixed in a weight ratio of 100:0-0:100, so as to provide a controllable biodegradation rate in a human body.

15. The block copolymer according to claim 1, which is a triblock copolymer or a higher block copolymer.

16. The block copolymer according to claim 1, which is selected from the compounds represented by one of the following formulae 6-11:

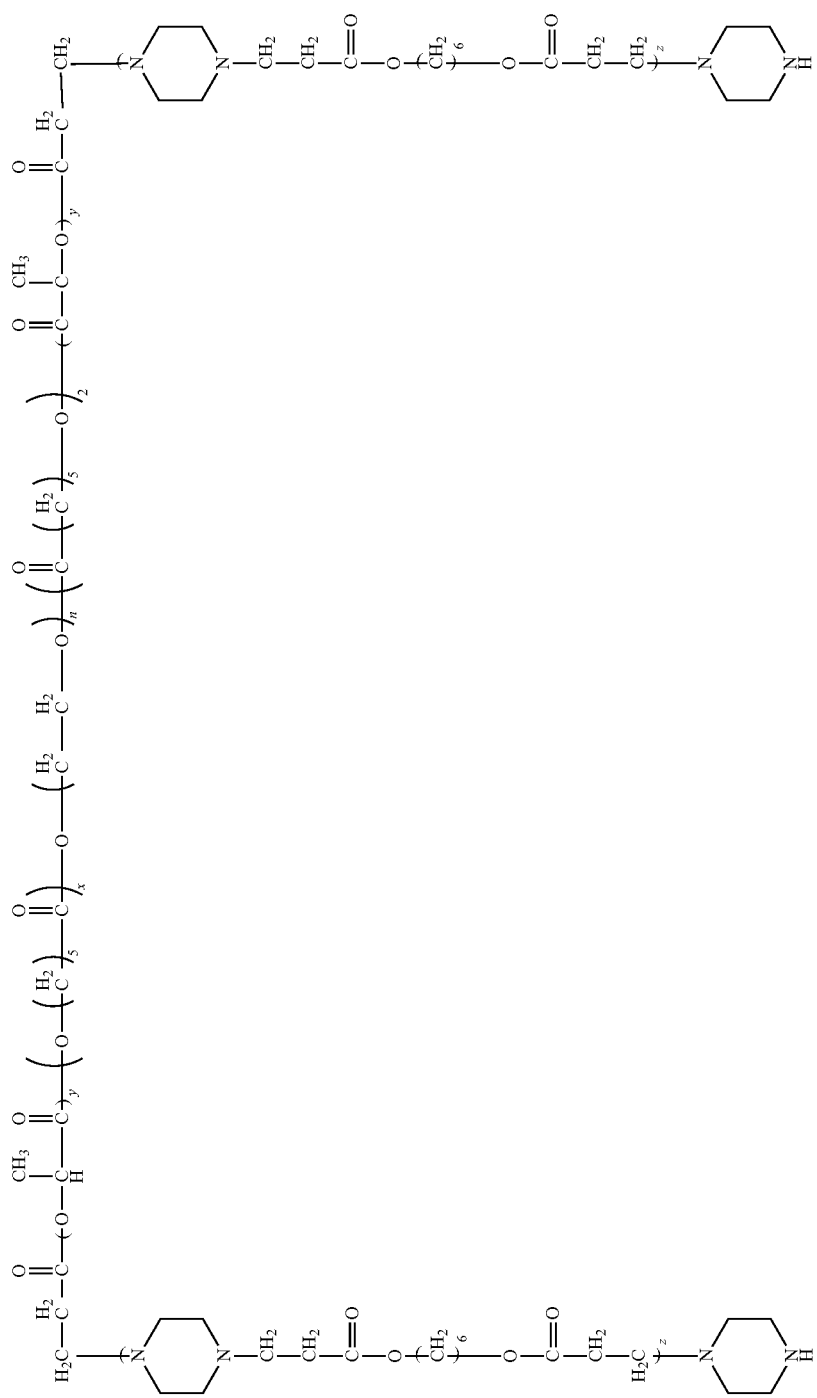
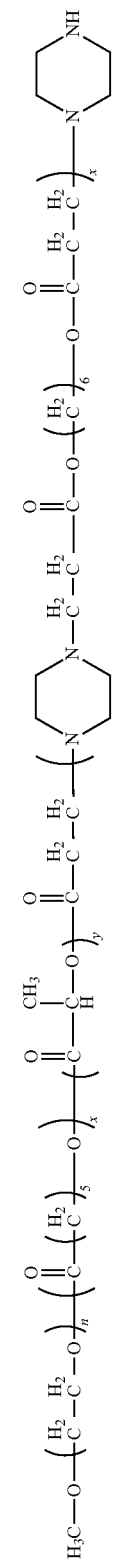

Formula 8
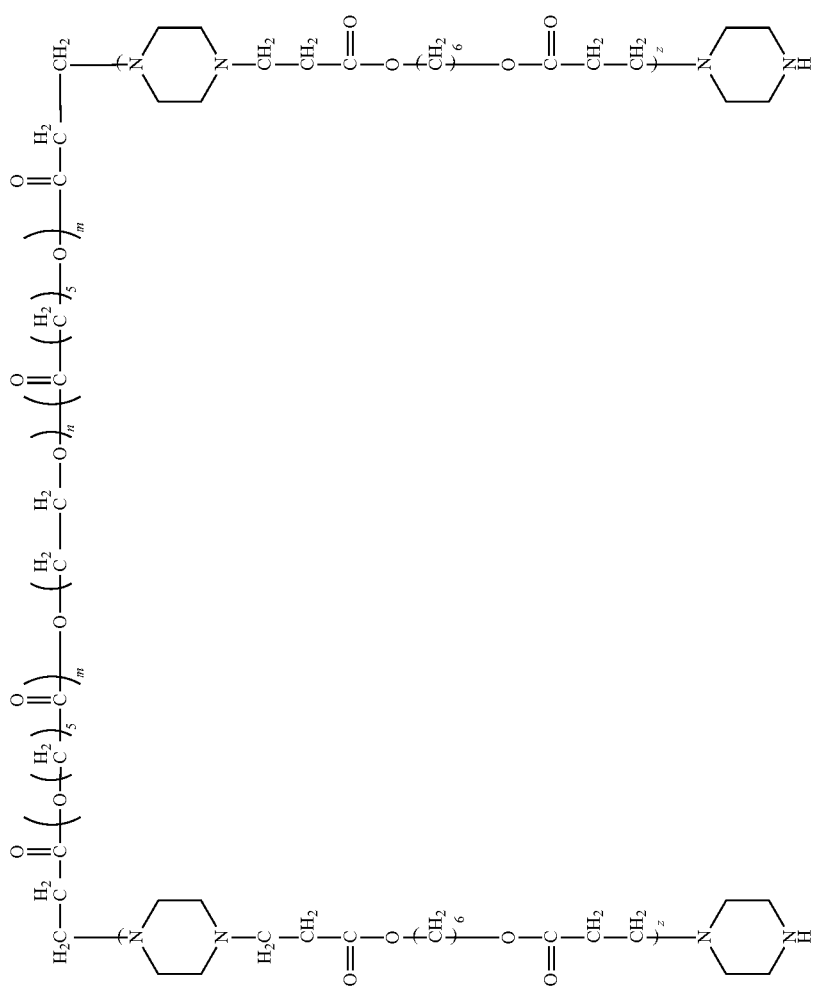
Formula 9
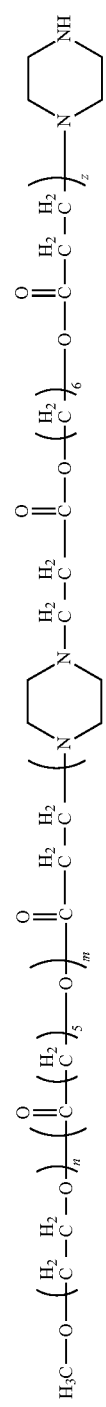

-continued
Formula 10
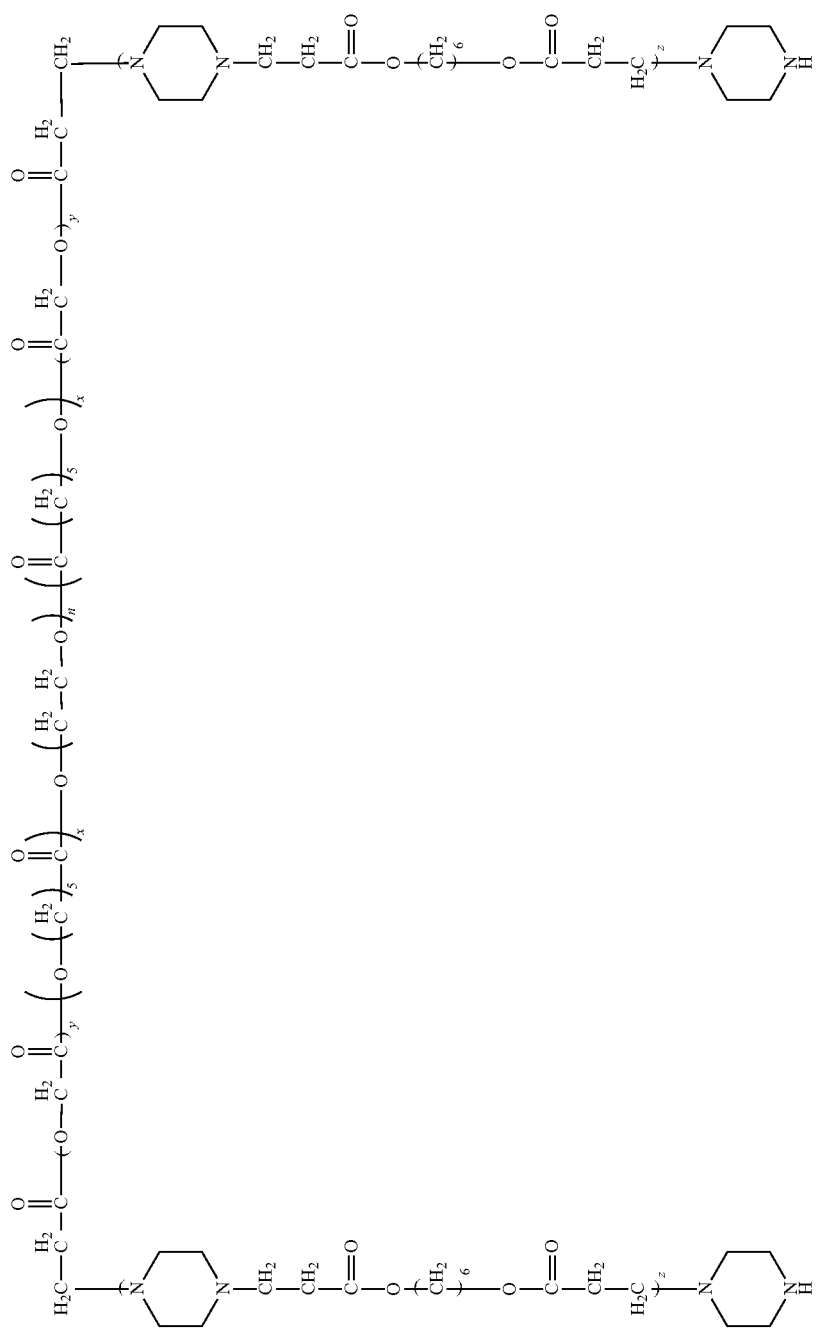
Formula 11
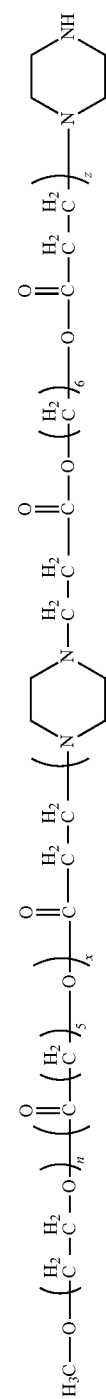

wherein each of x, y, z, n and is a natural number ranging from 1 to 10,000.

17. A polymeric hydrogel composition, comprising:
(a) a block copolymer as claimed in claim 1; and
(b) a physiologically active substance that is encapsulated with the block copolymer.

18. A carrier for drug delivery or diagnosis of diseases, which comprises a block copolymer of claim 1.

19. The block copolymer according to claim 1, which is used for a carrier for drug delivery or diagnosis of diseases.

* * * * *